March 27, 1951

E. H. LEONARD 2,546,227

NOVELTY HOUSE NUMBER

Filed March 26, 1948

INVENTOR.

Edward H. Leonard

BY

McMorrow, Berman & Davidson

ATTORNEYS

Patented Mar. 27, 1951

2,546,227

UNITED STATES PATENT OFFICE 2,546,227

NOVELTY HOUSE NUMBER

Edward H. Leonard, Schenectady, N. Y.

Application March 26, 1948, Serial No. 17,350

1 Claim. (Cl. 40—138)

This invention relates to signs and more particularly, to a novelty house number sign.

A main object of the invention is to provide a novel and improved house number sign which is very simple in construction, light in weight and attractive in appearance.

A further object of the invention is to provide an improved novelty house number sign including a movable bird or animal element which is adapted to be oscillated responsive to breezes or other vibrations, whereby an interesting and pleasing visual effect is obtained which enhances the general appearance and atmosphere of the house.

Further objects and advantages of the invention will become apparent from the following description and claim, and from the accompanying drawings, wherein:

Figure 1:
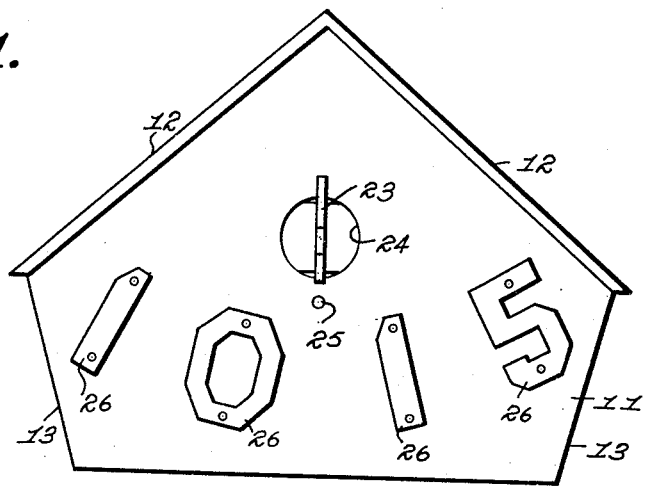
Figure 1 is a front elevational view of a novelty house number sign constructed in accordance with the present invention.
Figure 2:
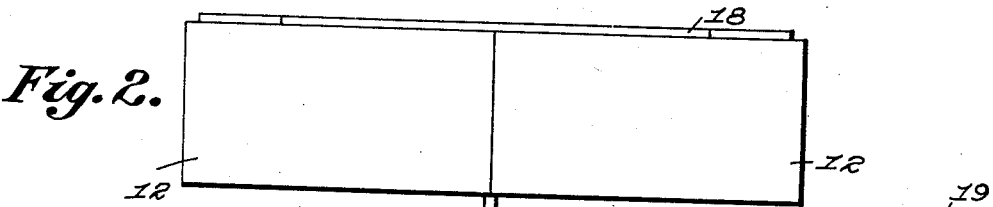
Figure 2 is a top plan view of the sign of Figure 1.
Figure 3:
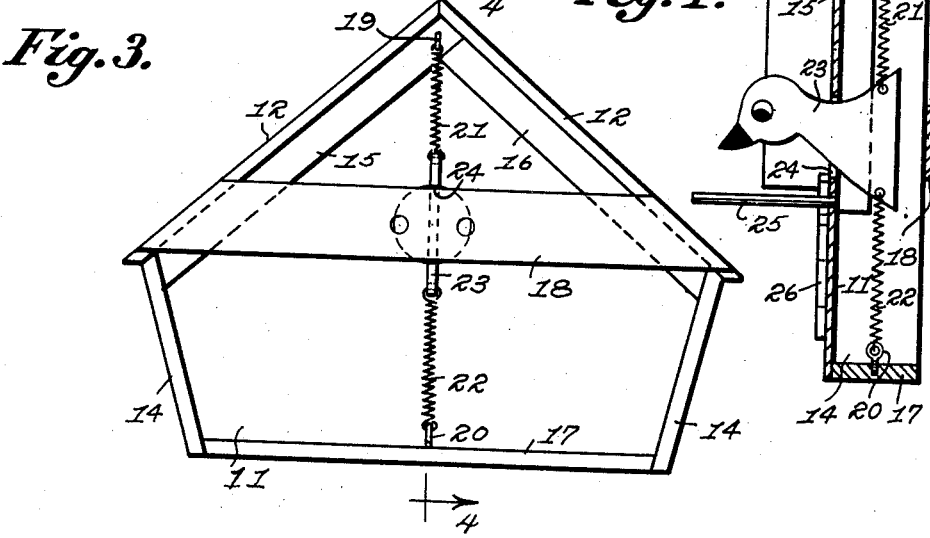
Figure 3 is a rear elevational view of the novelty sign of Figure 1.
Figure 4:
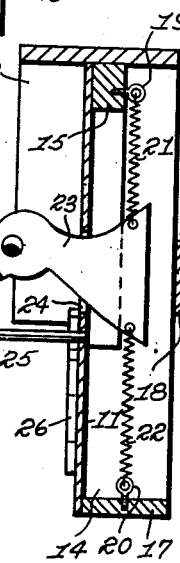
Figure 4 is a vertical cross-sectional view taken on line 4—4 of Figure 3.

Referring to the drawings the sign is shaped generally in the form of a bird house and may comprise, for example, a main vertical wall member 11 shaped to simulate in appearance the front wall of a bird house and having secured to its top edges the sloping downwardly divergent roof boards 12, 12. The side edges of wall member 11 are shown at 13, 13, and secured to said side edges and to the lower marginal under surface portions of the roof boards 12, 12 are rearwardly extending side walls 14, 14. Designated at 15 and 16 are nailing strips or bars secured to the inside upper marginal portions of wall member 11 providing nailing supports for the roof boards 12, 12. Secured to the inside lower marginal portions of wall member 11 and side walls 14, 14 is a horizontal bottom board 17. Connecting the lower rear edge portions of the roof boards 12, 12 is a tie strip 18.

Secured to the top end of nailing strip 15 is a screw eye 19 and secured to the intermediate portion of bottom board 17 is a similar screw eye 20. Connected to screw eyes 19 and 20 by means of respective tensed springs 21 and 22 is the rear portion of a profiled plate member 23, which may be made of plywood or the like, shaped to simulate the profile of the neck and head of a bird or animal, and suitably painted. The front wall member 11 is formed with an aperture 24 through which the head of the bird or animal projects, said aperture being sufficiently large to allow the head to oscillate around the axis defined by springs 21 and 22 in response to breezes or other vibrations. As illustrated in the drawings, a bird's head is shown at 23, and to increase the resemblance of the sign to a bird house a perch bar 25 is secured to wall member 11 below aperture 24 and projecting forwardly from the wall member.

The house numbers are secured to the lower portion of wall member 11, as shown at 26, so as to be clearly visible below the swinging bird or animal head 23.

The walls and roof of the sign may be suitably painted in a color scheme harmonizing with the outside of the home.

Due to the tension of springs 21 and 22 and the balanced position of head 23 with respect to said springs, a slight breeze or vibration will cause the head 23 to swing, providing a pleasing and interesting effect.

While a specific embodiment of a novelty house number sign has been disclosed in the foregoing description, it will be understood that various modifications within the spirit of the invention may occur to those skilled in the art. Therefore it is intended that no limitations be placed on the invention except as defined by the scope of the appended claim.

What is claimed is:

A novelty house number sign comprising a vertically disposed housing simulating a bird house and having a front wall provided with an opening extending therethrough, a vertically disposed animal head positioned in alignment with the opening in said front wall and having the head end arranged exteriorly and spaced from said front wall, and a pair of coil springs positioned on opposite sides of the other end of said animal head in alignment with the opening and operatively connected to said head and said housing whereby said head may oscillate in response to breezes or vibrations.

EDWARD H. LEONARD.

REFERENCES CITED

The following references are of record in the file of this patent:

UNITED STATES PATENTS

| Number | Name | Date |
|---|---|---|
| 753,599 | Mason | Mar. 1, 1904 |
| 1,219,839 | Molteni | Mar. 20, 1917 |
| 1,642,906 | Suggs | Sept. 20, 1927 |
| 2,001,880 | Lambourne | May 21, 1935 |
| 2,084,855 | Macaulay | June 22, 1937 |
| 2,110,646 | Currie | Mar. 8, 1938 |
| 2,168,384 | Barry | Aug. 8, 1939 |
| 2,202,178 | Welles | May 28, 1940 |

FOREIGN PATENTS

| Number | Country | Date |
|---|---|---|
| 338,679 | Italy | Mar. 31, 1936 |
| 196,861 | Great Britain | May 3, 1923 |